US006169578B1

(12) United States Patent
Chigira

(10) Patent No.: US 6,169,578 B1
(45) Date of Patent: *Jan. 2, 2001

(54) VIDEO CAMERA APPARATUS

(75) Inventor: Tatsuo Chigira, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/559,717

(22) Filed: Nov. 15, 1995

Related U.S. Application Data

(63) Continuation of application No. 08/083,005, filed on Jun. 24, 1993, now abandoned.

(30) Foreign Application Priority Data

Jun. 29, 1992 (JP) ...................................... 4-171080

(51) Int. Cl.[7] .................................................. H04N 5/232
(52) U.S. Cl. ........................................... 348/347; 348/358
(58) Field of Search .................................... 348/358, 345, 348/347; 354/400, 402, 195.12; 396/77, 79, 81, 82, 86, 133

(56) References Cited

U.S. PATENT DOCUMENTS

| 4,950,054 | * | 8/1990 | Wada et al. | 354/400 |
| 5,157,432 | * | 10/1992 | Fukuoka et al. | 354/400 |
| 5,223,981 | * | 6/1993 | Kaneda | 354/400 |
| 5,281,796 | * | 1/1994 | Kaneda et al. | 354/402 |
| 5,323,200 | * | 6/1994 | Hirasawa | 354/195.12 |

FOREIGN PATENT DOCUMENTS

0394901 * 10/1990 (EP) .............................. G02B 7/10

* cited by examiner

Primary Examiner—Tuan Ho
(74) Attorney, Agent, or Firm—Robin, Blecker & Daley

(57) ABSTRACT

A video camera of the kind performing a power varying action on a zoom lens while keeping its variator lens and its focus lens in a predetermined relation comprises a memory for storing information on driving speeds at which the variator lens is to be driven at respective moving positions thereof, a position detecting circuit for detecting the positions of the variator lens and the focus lens, and a control circuit for driving the variator lens and the focus lens, on the basis of information on a driving speed of the variator lens read out from the memory according to the result of detection made by the position detecting circuit, in such a manner that a driving speed of the focus lens remains nearly constant in the neighborhood of a telephoto end position of the zoom lens. The video camera is thus arranged to be capable of uniformalizing the driving speed of the focus lens even in the neighborhood of the telephoto end position where the follow speed of the focus lens tends to suddenly increase. The focus lens is, therefore, allowed to accurately follow the variator lens irrespective of the position of the variator lens, so that zooming can be carried out without defocusing.

19 Claims, 9 Drawing Sheets

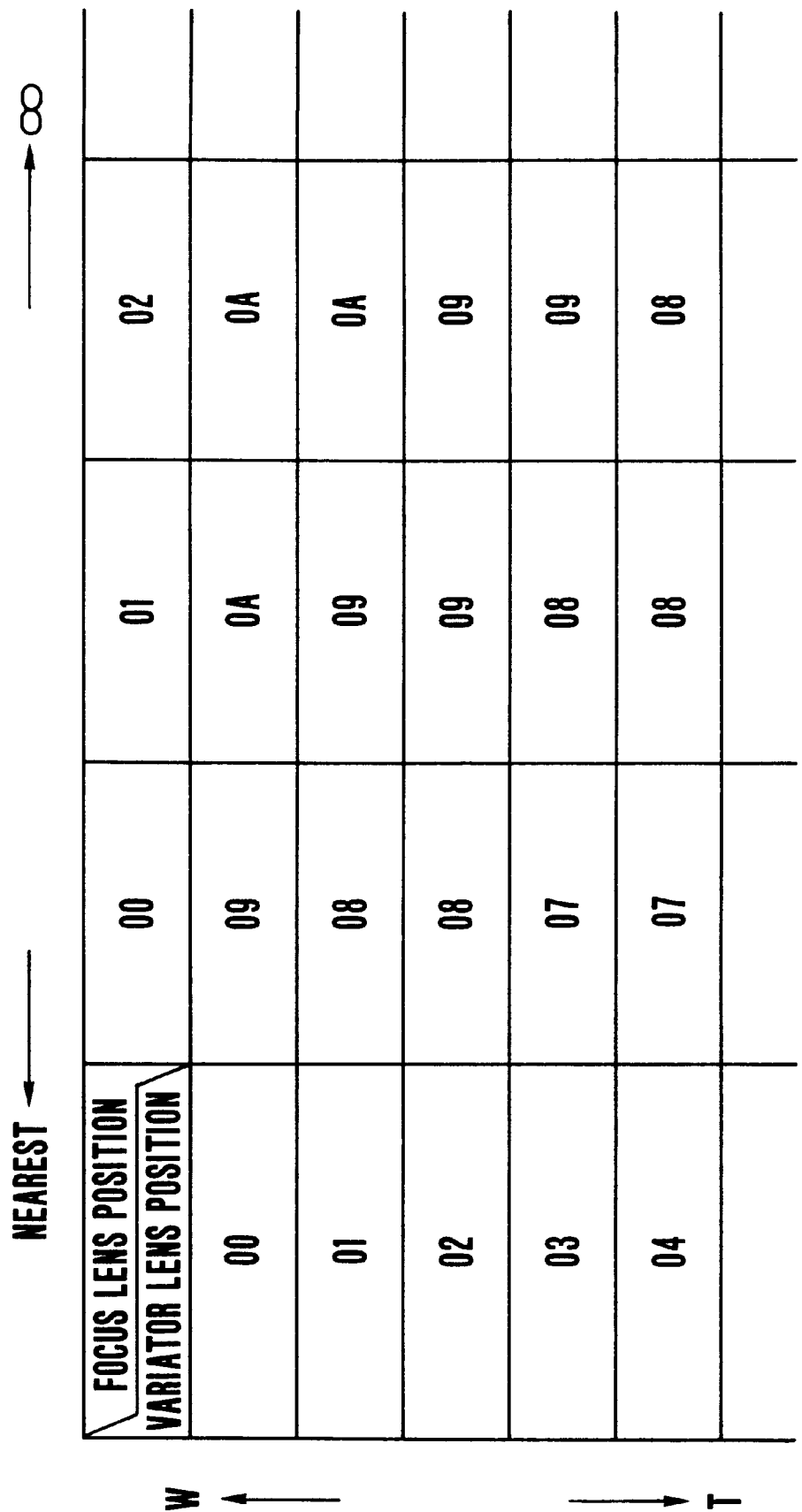

VIDEO CAMERA APPARATUS

This is a continuation application under 37 CFR 1.62 of prior application Ser. No. 08/083,005 filed on Jun. 24, 1993, now abandoned.

BACKGROUND OF THE INVENTION

1. Field of the Invention

This invention relates to a video camera of the kind having a rear-focus type zoom lens in which a focus lens is disposed rearwardly of a variator lens, and particularly relates to a control method of driving the variator lens and the focus lens during a zooming operation.

2. Description of the Related Art

It has recently become necessary for a video camera or the like to have a zoom lens mounted thereon to perform one of the important functions of the camera. Among such zoom lenses, rear-focus type zoom lenses are popularly employed as they permit reduction in size.

The zoom lens of this type has generally been arranged to have variator and focus lenses interlocked with each other by a cam tube for correcting a defocused state resulting from a magnifying power varying action. However, for reduction in size and weight, the cam tube interlocking arrangement has recently come to be replaced with an electrical control arrangement wherein the variator and focus lenses are driven respectively by discrete motors and their interlocked relation is electrically controlled. Lenses having such an electrical control arrangement are now popularly in use and called electronic cam type zoom lenses.

A video camera of the kind having a zoom lens of the electronic cam type is generally arranged to have the variator lens driven by a DC motor and the focus lens by a stepping motor, to drive and control them to keep their positions in such a relation as to keep the zoom lens in an in-focus state by detecting the position of the variator lens, for example, with a potentiometer which uses a resistor.

The magnifying power varying action of the zoom lens is carried out, as mentioned above, by driving the variator lens with a variator-lens driving DC motor arid by driving the focus lens with a stepping motor in general.

Further, the variator lens is driven in such a way as to move at a constant speed by applying a preset voltage to the variator-lens driving DC motor.

In the video camera of the kind using the rear-focus type zoom lens as mentioned above, the variator lens and the focus lens are driven in a relation which is shown in FIG. 9(a), wherein a reference symbol V denotes the positions of the variator lens and another reference symbol R denotes the positions of the focus lens.

When the variator lens is driven at a constant speed as shown in FIG. 9(c) while keeping a relation to the focus lens as shown in FIG. 9(a), the driving speed of the focus lens becomes as shown in FIG. 9(b). As apparent from FIG. 9(b), with the variator lens driven at a constant speed, the driving speed of the focus lens becomes extremely high at a telephoto-end position.

Compared with the DC motor, the stepping motor which is arranged to drive the focus lens greatly vibrates and makes a large noise. The vibration and noise increase with the speed of driving. Therefore, in the case of a video camera using a stepping motor for its zoom lens, the sound of driving the zoom lens tends to be recorded on a video tape as a noise through the microphone of the video camera when the stepping motor is driven at a high speed. An out-of-phase state might occur when the speed of the stepping motor comes to exceed a followable speed limit. In the event of the out-of-phase state, a predetermined relationship between the variator lens and the focus lens (relationship in which they are moved while maintaining an in-focus state) is disadvantageously interrupted to bring about a defocused state.

Further, according to the prior art arrangement described above, any attempt to retard the driving speed of the variator lens in the neighborhood of the telephoto end position of the zoom lens by simply lowering a voltage applied to the variator-lens driving DC motor tends to result in an unnatural intermittent motion of the variator lens, because of a strong adverse effect of uneven motor rotation resulting from the lowered voltage. Any video image obtained under such a condition is hardly agreeable.

Further, an attempt to solve this problem by applying a constant speed control on the basis of changes taking place in the output signal of the potentiometer is hardly feasible, because a microcomputer in charge of this specific control controls also actuators for other purposes such as control over an iris stop or the like and is hardly capable of carrying out fine control for this purpose. That attempt thus has presented also a problem similar to the method of lowering the voltage applied to the variator-lens driving DC motor.

SUMMARY OF THE INVENTION

This invention is directed to the solution of the problems described in the foregoing. It is a first object of this invention to provide a video camera which is capable of zooming its lens without defocusing.

It is a second object of this invention to provide a video camera which is capable of zooming its lens without defocusing even in zooming at a high speed.

It is a third object of the invention to provide a video camera which is capable of zooming its lens without defocusing the lens even during the process of high-speed zooming from a wide-angle end position of the lens to a telephoto end position of the lens.

To attain these objects, a video camera which is arranged as a preferred embodiment of this invention to carry out a magnifying power varying action on a zoom lens while keeping a variator lens and a focus lens thereof in a predetermined relation comprises storing means for storing information on driving speeds at which the variator lens is to be driven at respective moving positions thereof and for storing information on a driving speed at which the variator lens is to be driven so as to make the focus lens driven at a predetermined constant speed in the neighborhood of a telephoto end position of the zoom lens, position detecting means for detecting et position of the variator lens and that of the focus lens, and control means for driving the variator lens and the focus lens, on the basis of information on a driving speed of the variator lens read out from the storing means according to a result of detection made by the position detecting means, in such a manner that a driving speed of the focus lens remains nearly constant in the neighborhood of the telephoto end position of the zoom lens.

It is a fourth object of this invention to provide a video camera which is capable of stably carrying out zooming and focusing even on the side of a telephoto end position of a zoom lens where a driving speed of a focus lens comes to increase.

To attain this object, a video camera which is arranged as a preferred embodiment of this invention to carry out a magnifying power varying action on a zoom lens while keeping a variator lens and a focus lens thereof in a predetermined relation comprises storing means for storing information on driving speeds at which the focus lens is to be driven at respective moving positions thereof, position detecting means for detecting a position of the variator lens and that of the focus lens, and control means for driving the variator lens and the focus lens, on the basis of information on a driving speed of the focus lens read out from the storing means according to a result of detection made by the position detecting means, in such a manner that a driving speed of the focus lens remains nearly constant in the neighborhood of a telephoto end position of the zoom lens.

A video camera arranged as another preferred embodiment of this invention to carry out a magnifying power varying action on a zoom lens while keeping a variator lens and a focus lens thereof in a predetermined relation comprises storing means for storing information on driving speeds at which the variator lens is to be driven at respective moving positions thereof and information on driving speeds at which the focus lens is to be driven at respective moving positions thereof, position detecting means for detecting a position of the variator lens and that of the focus lens, and control means for driving the variator lens and the focus lens, on the basis of information on a driving speed of the variator lens and a driving speed of the focus lens read out from the storing means according to a result of detection made by the position detecting means, wherein the information on the driving speeds of the variator lens stored in the storing means is set so as to keep a driving speed of the focus lens nearly constant in the neighborhood of a telephoto end position of the zoom lens.

Therefore, the driving speed of the focus lens can be uniformalized made uniform even in the neighborhood of the telephoto end position where the following speed of the focus lens tends to suddenly increase. The above-stated arrangement thus enables the embodiment to carry out a zooming action without defocusing by allowing the focus, lens to reliably follow the variator lens irrespective of the moving position of the variator lens.

The above and other objects and features of this invention will become apparent from the following detailed description of embodiments thereof taken in conjunction with the accompanying drawings.

BRIEF DESCRIPTION OF THE DRAWINGS

FIG. 4 is a data table showing driving speeds of the variator lens which are stored in the form of a table for use in the video camera of this invention.

DETAILED DESCRIPTION OF THE PREFERRED EMBODIMENTS

Figure 1:
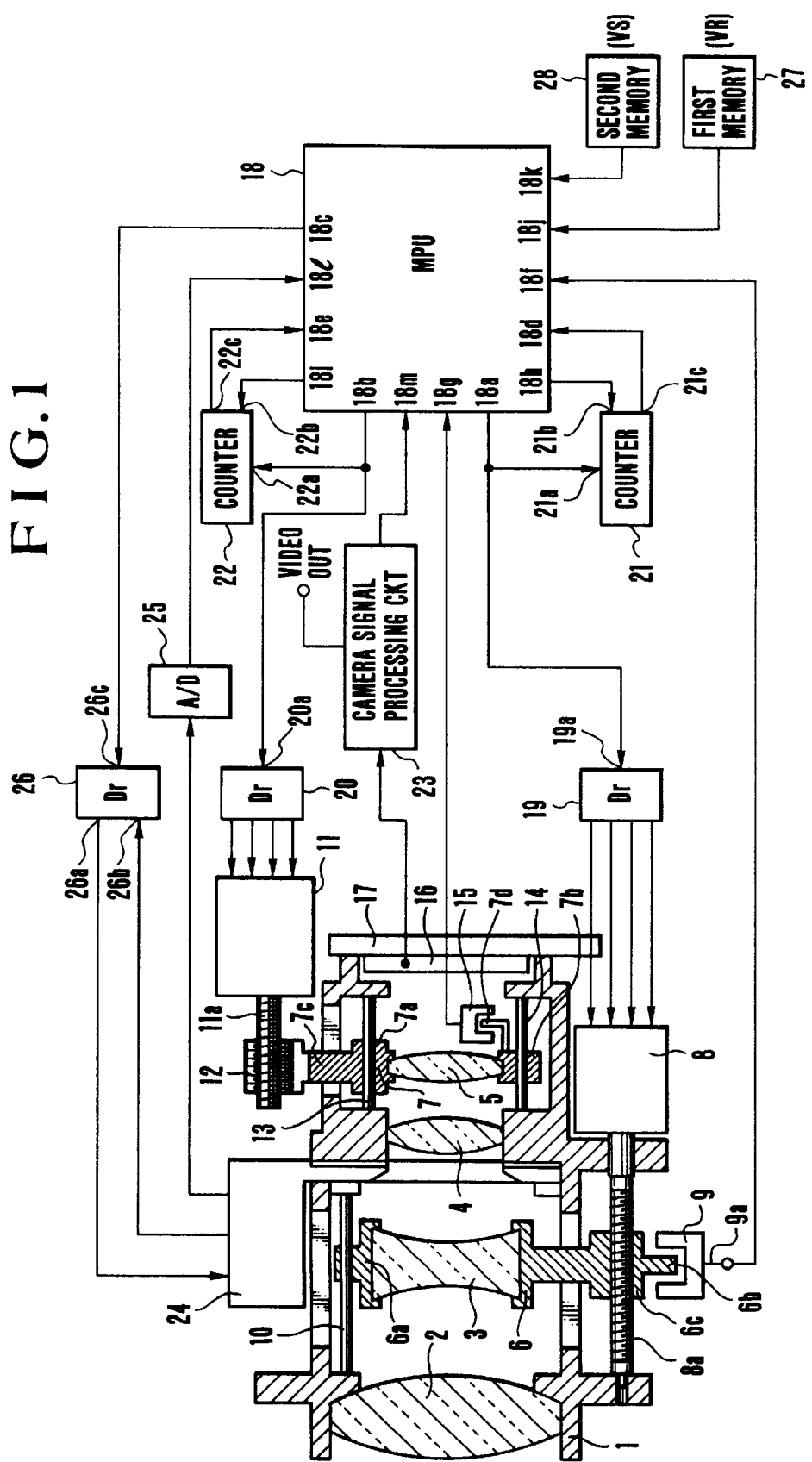
FIG. 1 is a block diagram showing the arrangement of a video camera arranged according to this invention as a first embodiment thereof.
Figure 2:
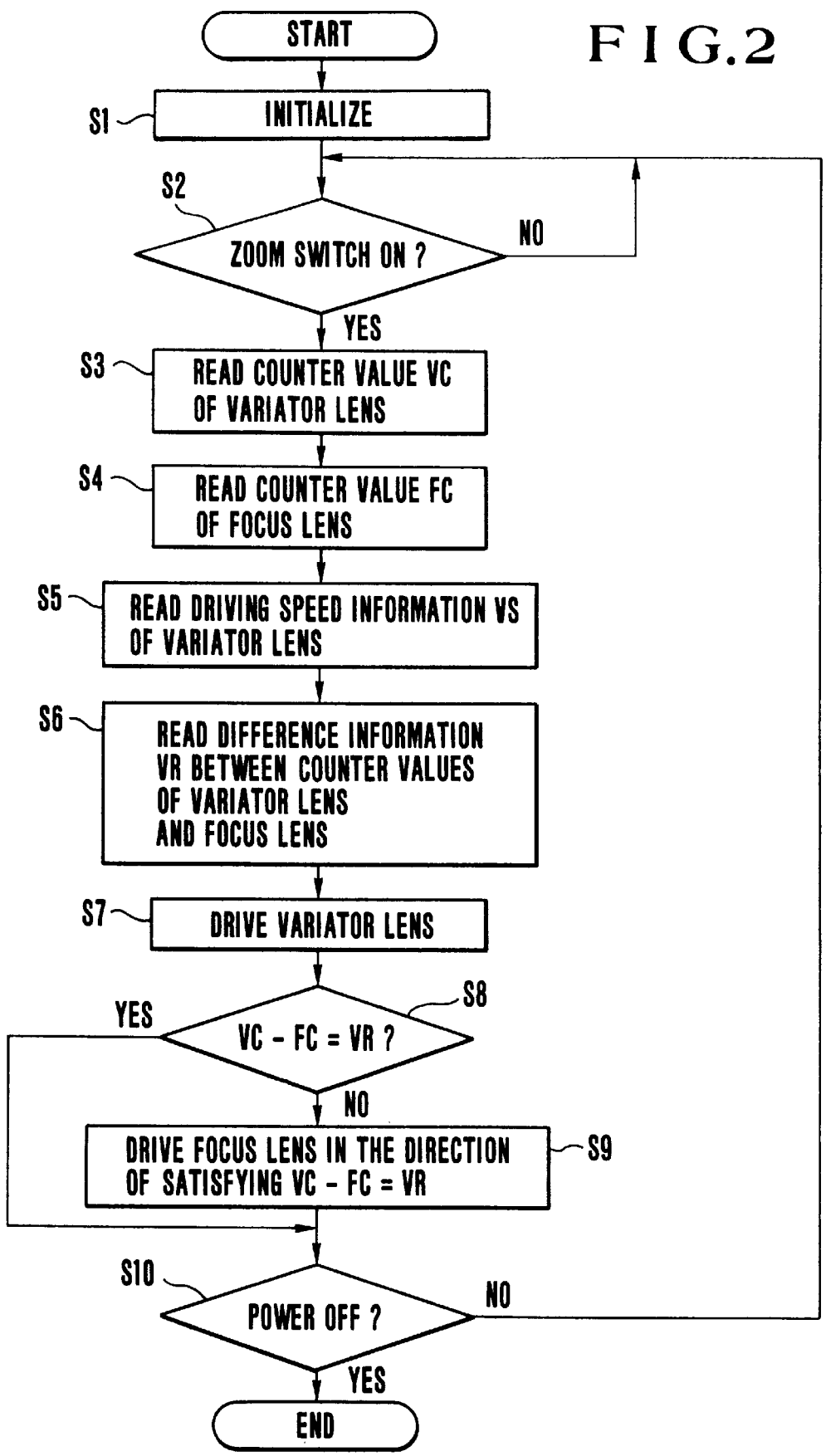
FIG. 2 is a flow chart showing a zooming control operation of the first embodiment of this invention.
Figure 3A:
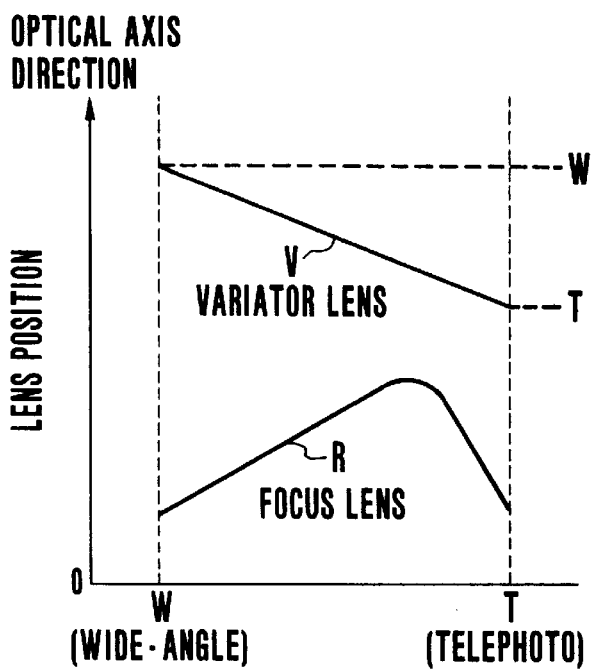
FIGS. 3(a), 3(b), and 3(c) show relations between the variator lens and the focus lens of the video camera arranged according to this invention.
Figure 3B:
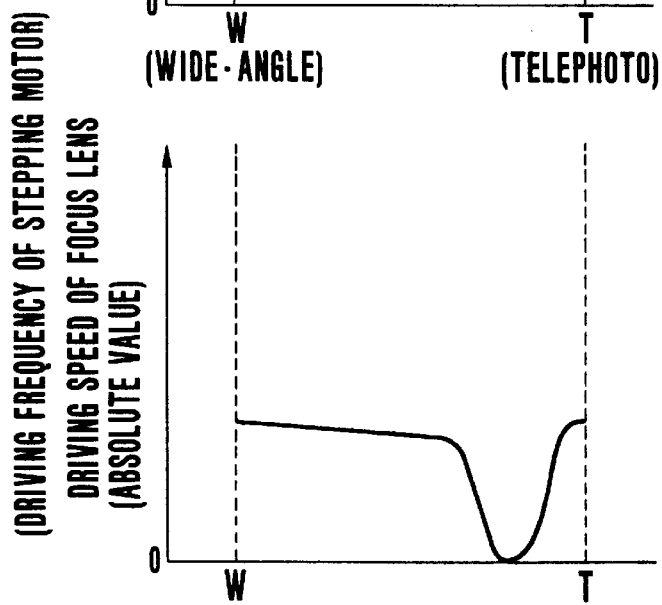
Figure 3C:
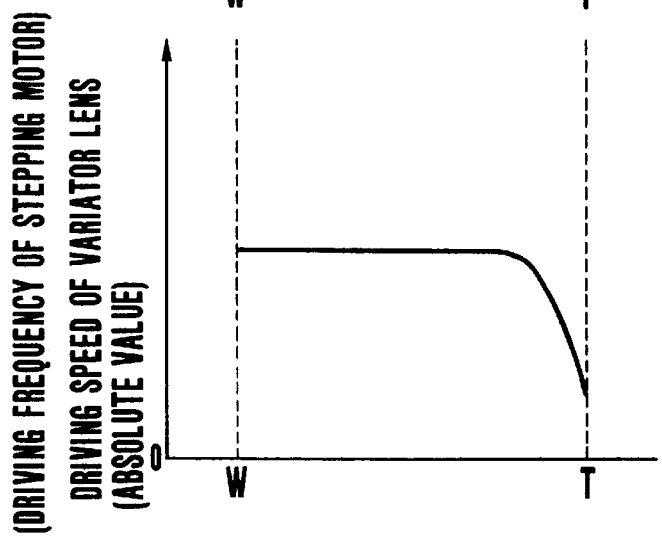

Video cameras arranged according to this invention as preferred embodiments thereof are described in detail with reference to the accompanying drawings FIG. 1 is a block diagram showing a video camera arranged as a first embodiment of the invention. FIG. 2 is a flow chart showing the operation of the first embodiment. FIG. 3(a) shows a relation obtained in zooming between the position of a variator lens and that of a focus lens. FIG. 3(b) shows driving speeds of the focus lens to be used during zooming. FIG. 3(c) shows driving speeds of the variator lens during zooming. FIG. 4 shows an information table storing information on the driving speeds of the variator lens.

Referring to FIG. 1, a first lens tube is denoted by reference numeral 1, and a photo-taking lens is composed of lens groups 2, 3, 4 and 5. The lens groups 2 and 4 are fixed lenses. The lens group 3 is a variator lens. The lens group 5 is a focus lens.

A second lens tube 6 carries the variator lens 3. A third lens tube 7 carries the focus lens 5. A first stepping motor 8 is arranged to drive the variator lens 3. A first photointerrupter 9 is arranged to detect the initial position of the variator lens 3. A first guide bar 10 is arranged to guide the second lens tube 6 which carries the variator lens 3 in the direction of an optical axis. A second stepping motor 11 is arranged to drive the focus lens 5. Reference numeral 12 denotes a rack. Second and third guide bars 13 and 14 are arranged to guide, in the direction of the optical axis, the third lens tube 7 which carries the focus lens 5. A second photointerrupter 15 is arranged to detect the initial position of the focus lens 5. An image sensor 16 which is a CCD or the like is arranged to photo-electrically convert an object image formed by the photo-taking lens into a pickup image signal and to output the pickup image signal. A CCD holder 17 is arranged to carry the image sensor (CCD) 16. A microcomputer 18 is arranged to control the whole operation of a lens system arranged according to this invention. The microcomputer 18 has output terminals 18a, 18b, 18c, 18h and 18i and input terminals 18d, 18e, 18f, 18g, 18j, 18k, 18l and 18m.

A first stepping motor driving circuit 19 is arranged to drive and control the stepping motor 8 for driving the variator lens 3 on the basis of an output of the microcomputer 18. A second stepping motor driving circuit 20 is arranged to drive and control the stepping motor 11 for driving the focus lens 5 on the basis of an output of the microcomputer 18. A first counter 21 is arranged to count driving step pulses supplied from the microcomputer 18 to the first stepping motor driving circuit 19 and detect the moving position of the variator lens 3. A second counter 22 is arranged to count driving step pulses supplied from the microcomputer 18 to the second stepping motor driving circuit 20 and detect the moving position of the focus lens 5.

A camera signal processing circuit 23 is arranged to perform a predetermined signal processing action on the pickup image signal outputted from the CCD (image sensor) 16 to convert it into a video signal of a standard TV signal form and to output the video signal from a video output terminal "video out". At the same time, the camera signal processing circuit 23 supplies the control microcomputer 18 with a signal such as a high-frequency component of the pickup image signal which depends on the contrast of the video image and varies with the state of focus. This signal is used as information for focus adjustment to be made by driving the focus lens 5.

An iris unit 24 consists of iris blades for control over the amount of aperture, a Hall element for detecting an aperture value and the moving speed of the iris blades, etc.

A first A/D (analog-to-digital) converter 25 is arranged to convert the aperture value information outputted from the iris unit 24 into a digital aperture value and to supply the digital aperture value to the microcomputer 18.

An iris driving circuit 26 is arranged to drive the iris unit 24. The iris driving circuit 26 has its output terminal 26a connected to the driving coil of an iris driving IG meter (not shown) which is included in the iris unit 24. The input terminal 26b of the iris driving circuit 26 is connected to the output of a speed detecting coil (not shown) which is arranged to detect the moving speed of the iris blades. Another input terminal 26c of the iris driving circuit 26 is connected to the iris driving signal output terminal 18c of the microcomputer 18. The iris driving circuit 26 is thus arranged to drive the iris blades of the iris unit 24 in accordance with a control signal supplied from the iris driving signal output terminal 18c. Further, the output signal of the aperture-value detecting Hall element (not shown) which is disposed within the iris unit 24 is arranged to be supplied to the input terminal 181 of the microcomputer 18 through the A/D converter 25.

Therefore, the iris driving circuit 26 drives the iris unit 24 according to the driving signal supplied from the microcomputer 18 and, at the same time, detects and controls the moving speed of the iris blades so as to obtain an adequate moving speed. An aperture value thus obtained is detected by the aperture-value detecting Hall element which is not shown. Information on the aperture value thus detected is supplied to the microcomputer 18 via the A/D converter 25. The aperture is thus controlled and adjusted to an aperture value as instructed by the microcomputer 18.

A first memory 27 stores information on the positional relation between the variator lens and the focus lens as expressed by a difference between the count value of the first counter 21 and that of the second counter 22 for each lens position. When a zoom switch which is not shown is operated, the information stored is read out to find an apposite positional relation between the variator lens and the focus lens according to whether the zoom switch is operated toward a telephoto end position or toward a wide-angle end position.

A second memory 28 stores information on a plurality of driving speeds of the variator lens 3 corresponding to the positions of the variator lens and the focus lens, as will be described in detail later herein. The second memory 28 is provided for the purpose of carrying out a zooming operation without bringing about any defocused state over the whole range of zooming from the wide-end position (W) to the telephoto end position (T) by varying the driving speed of the variator lens 3 according to the positional relation between the variator lens 3 and the focus lens 5.

In the case of a rear focus type zoom lens, an in-focus point of the zoom lens changes when the variator lens 3 is moved. In order to prevent occurrence of any defocused state during a zooming operation, therefore, the focus lens 5 must be also shifted to follow the changes taking place in the position of the focal plane as the variator lens 3 is moved. This relation is described with reference to FIG. 3(a) as follows.

In FIG. 3(a), the ordinate axis shows the direction of an optical axis. When the variator lens 3 moves from a wide-angle end to a telephoto end along a locus as represented by a curve V, the in-focus point varies along a locus represented by a curve R as the variator lens 3 moves. Therefore, zooming can be accomplished without bringing about any defocused state by moving the focus lens 5 along the locus represented by the curve R. In other words, the curve R represents the locus of the movement of the focus lens 5 which must be moved along with that of the variator lens 3. As apparent from FIG. 3(a), while the variator 3 is simply moving in one direction, the focus lens 5 moves along a complex locus.

The locus shown in FIG. 3(a) is a basic locus. In accordance with this basic locus, a zoom lens focused on an object of shooting can be zoomed without defocusing. In actuality, information on a plurality of loci which, are variously arranged for different object distances are prepared. In a case where the zoom lens comes to deviate from the in-focus state during the process of zooming due to a change taking place in the object, an automatic focusing device which is not shown corrects the deviation by moving the focus lens onto a locus provided for an applicable object distance. However, since the zooming operation of the embodiment is discussed herein on the assumption that the zoom lens is in an in-focus state for one object, moving loci of the focus lens for other object distances are not illustrated in FIG. 3(a).

Within the first memory 27, information on the moving positions of the focus lens 5 relative to those of the variator lens 3 is stored in the form of the relative distances of the curves V and R. (In actuality, since the position of the variator lens 3 and that of the focus lens 5 are detected by counting the stepping motor driving pulses, what is stored is information on a difference between two count values thus obtained.) The actual position of the variator lens 3 and that of the focus lens 5 are respectively detected by the counters 21 and 22. A difference between the count values obtained from the counters 21 and 22 is compared with the information stored in the first memory 27, so that the driving control for the focus lens 5 can be accurately accomplished. Further, as apparent from FIG. 3(a), the speed of the focus lens 5 suddenly changes to a high speed when the variator lens 3 comes near the telephoto end position. This sudden change is used to cause a defocused state as it prevents the conventional arrangement from having the focus lens 5 accurately follow the variator lens 3. On the other hand, this invention solves this problem and keeps the follow speed of the focus lens constant.

The internal arrangement of the lens barrel of this embodiment is described as follows. The first lens tube 1 carries the first lens group 2, the third lens group 4, the first stepping motor 8, the first photointerrupter 9, the first, second and third guide bars 10, 13 and 14, the second stepping motor 11, the second photointerrupter 15, and the CCD holder 17 to which the CCD (image sensor) 16 is secured. The second lens tube 6 carries the variator lens 3 and is provided with a bearing part 6a. The bearing part 6a is fitted on the first guide bar 10 fixed to the first lens tube 1. The second lens tube 6 is thus supported so as to be movable in the direction of the optical axis relative to the first lens tube 1. The second lens tube 6 is further provided with a female thread part 6c in a position nearly symmetric with the bearing part 6a relative to the optical axis. The female thread part 6c engages a lead screw 8a which is formed in one body with the output shaft of the first stepping motor 8 secured to the first lens tube 1. The second lens tube 6 is thus arranged to be driven by the first stepping motor 8 in the direction of the optical axis.

The second lens tube 6 has a projection 6b which is arranged to pass through a slit part formed in the first photointerrupter 9. The first photointerrupter 9 is arranged to change its output when the projection 6b of the second lens tube 6 passes through the slit part. The change of the output of the first photointerrupter 9 makes it possible to find that the variator lens 3 is in a predetermined position, i.e., in its initial position, in the case of this embodiment.

To the third lens tube 7 is secured the fourth lens group, i.e., the focus lens 5. The third lens tube 7 is provided with a first bearing part 7a, a second bearing part 7b and an extension 7c. The first bearing part 7a of the third lens tube 7 is fitted on the second guide bar 13 which is secured to the first lens tube 1. The second bearing part 7b of the third lens tube 7 is fitted on the third guide bar 14 which is also secured to the first lens tube 1. The third lens tube 7 is thus carried by these guide bars in such a way as to be movable in the direction of the optical axis relative to the first lens tube 1.

The extension 7c of the third lens tube 7 has a rack screw 12 secured thereto. The rack screw 12 engages the lead screw 11a. The lead screw 11a is arranged in one body with the output shaft of the second stepping motor 11 which is secured to the first lens tube 1. The extension 7c is thus arranged to enable the third lens tube 7 to be driven by the second stepping motor 11 in the direction of the optical axis.

The third lens tube 7 is further provided with a projection 7d. The projection 7d is arranged to pass through a slit part of the second photointerrupter 15 which is secured to the first lens tube 1 when the third lens tube 7 moves in the direction of the optical axis. The second photointerrupter 15 is arranged to change its output when the projection 7d of the third lens tube 7 passes through the slit part. The change of the output of the second photointerrupter 15 permits detection of the fact that the focus lens 5 is in a predetermined position, i.e., in its initial position, in the case of this embodiment.

The first stepping motor driving circuit 19 has its output terminals connected to the armature coil of the first stepping motor 8. The input terminal 19a of the first stepping motor driving circuit 19 is connected to the output terminal 18a of the microcomputer 18. With a driving step pulse signal supplied from the microcomputer 18 according to the desired direction of rotation, the first stepping motor driving circuit 19 causes the first stepping motor 8 to move stepwise as much as a number of steps corresponding to the number of driving step pulses and in the rotating direction indicated by the driving step pulse signal received from the microcomputer 18.

The second stepping motor driving circuit 20 has its output terminals connected to the armature coil of the second stepping motor 11. The input terminal 20a of the second stepping motor driving circuit 20 is connected to the output terminal 18b of the microcomputer 18. With a driving step pulse signal supplied from the microcomputer 18 according to the desired direction of rotation, the second stepping motor driving circuit 20 causes the second stepping motor 11 to move stepwise as much as a number of steps corresponding to the number of driving step pulses and in the rotating direction indicated by the driving step pulse signal received from the microcomputer 18.

The first counter 21 counts, by using its input terminal 21a, the driving step pulses being supplied from the microcomputer 18 to the first stepping motor driving circuit 19. A count value thus obtained is supplied from the output terminal 21c of the first counter 21 to the input terminal 18d of the microcomputer 18. The count value of the first counter 21 is reset by a rest signal coming to the input terminal 21b of the first counter 21 from the microcomputer 18. In the case of the embodiment, when a power supply for the video camera is turned on, the first stepping motor 8 is driven until the projection 6b of the second lens tube 6 passes through the slit provided between the light projecting and receiving elements of the first photointerrupter 9. A position thus obtained is regarded as an initial position which is to be used as a datum point. The counter 21 is then reset according to the reset signal supplied from the output terminal 18h of the microcomputer 18. The position of the variator lens 3 is thus initialized. The initial position of the variator lens 3 can be set at any point within the moving range of the variator lens 3 as desired.

In driving the variator lens 3, the counter 21 receives the driving step pulses from the output terminal 18a of the microcomputer 18 and the moving position of the variator lens 3 is detected either by up-counting or down-counting the number of pulses by which the first stepping motor 8 is caused to move stepwise according to the direction of driving. Information on the moving position of the variator lens 3 thus detected is supplied to the microcomputer 18.

The second counter 22 counts, by using its input terminal 22a, the driving step pulses supplied from the microcomputer 18 to the second stepping motor driving circuit 20. Information on a count value thus obtained is supplied from the output terminal 22c of the second counter 22 to the input terminal 18e of the microcomputer 18. The count value of the second counter 22 is reset upon receipt of a reset signal supplied to the input terminal 22b of the counter 22 from the microcomputer 18. In the case of this embodiment, when the power supply for the video camera is turned on, the second stepping motor 8 is driven until the projection 7d of the third lens tube 7 comes to pass through the slit provided between the light projecting and receiving elements of the second photointerrupter 15. A position thus obtained is regarded as an initial position which is to be used as a datum point. The counter 22 is then reset according to the reset signal supplied from the output terminal 18i of the microcomputer 18. The focus lens 5 is thus initialized.

In driving the focus lens 5, the second counter 22 operates as follows. The driving step pulses outputted from the output terminal 18b of the microcomputer 18 are taken in at the input terminal 22a. The moving position of the focus lens 5 is detected by up-counting or down-counting, according to the direction of driving, a number of pulses by which the second stepping motor 11 is driven stepwise. Information on the moving position of the focus lens thus detected is supplied to the microcomputer 18.

The first memory 27 and the second memory 28 are nonvolatile storages. Information on driving speeds at which the variator lens 3 is to be driven according to the position of the variator lens 3 and that of the focus lens detected and known by the microcomputer 18 from the count values of the first and second counters 21 and 22 is previously stored in the second memory 28. FIG. 4 is a table showing the driving speed information of the variator lens 3 stored in the second memory 28. The stored information includes driving speeds of the variator lens 3 shown at addresses which are defined respectively by the positions of the variator lens 3 indicated in the form of the count values of the first counter 21 and the positions of the focus lens 5 indicated in the form of the count values of the second counter 22.

The state of storage of the first memory 27 is omitted from illustration. However, the first memory 27 is arranged in the same manner as what is shown in FIG. 4.

The zooming operation of the video camera which is arranged according to this invention is described with reference to FIG. 2 and FIGS. 3(a) to 3(c) as follows.

FIG. 2 which is a flow chart shows the control operation of the microcomputer 18. Referring to FIG. 2, when the power supply for the video camera is turned on, the microcomputer 18 starts its control operation. At a step S1, the variator lens 3 and the focus lens 5 are driven to their initial positions which are datum points where the first and second counters 21 and 22 are reset with the above-stated projections 6b and 7b coming into the slits of the first and second photointerrupters 9 and 15. An initializing action comes to an end.

Upon completion of the initialization, the flow of control operation comes to a step S2. At the step S2, a check is made for a zooming operation. If a zoom switch which is not shown is found to be in an on-state, the flow comes to a step S3. At the step S3, information VC on the position of the variator lens 3 is read in through the count value of the first counter 21. At a step S4, the information FC on the position of the focus lens 5 is read in through the count value of the second counter 22. At a step S5, from the table in the second memory 28 which is shown in FIG. 4, information VS on a driving speed of the variator lens 3 corresponding to the position information VC and the position information FC is read on the basis of the position information VC and FC.

At a step S6, the microcomputer 18 reads out, from the first memory 27 as mentioned above, information VR on a difference between the count values of the first and second counters 21 and 22, i.e., a difference between the curves V and R shown in FIG. 3(a), which represents an apposite positional relation between the variator lens 3 and the focus lens 5 which should be obtained after the start of driving and is determined by the positions of the variator lens 3 and the focus lens 5 and according to whether the zoom switch is pushed for zooming toward the telephoto end position or toward the wide-angle end position.

At a step S7, the microcomputer 18 begins to cause the variator lens 3 to be driven at a speed decided on the basis of the driving speed information VS of the variator lens 3 obtained at the step S5. At a step S8, a check is made to find if the positions of the variator lens 3 and the focus lens 5 are satisfying a relation preset as necessary for retaining an in-focus state. More specifically, the check is made to find if the difference between the count values of the first and second counters 21 and 22 which represent respectively the position information VC of the variator lens 3 and the position information FC of the focus lens 5 is equal to the difference information VR.

If the positional relation between the variator lens 3 and the focus lens 5 is found at the step S8 to be not the preset relation required for retaining an in-focus state, the flow comes to a step S9. At the step S9, the focus lens 5 is driven in the direction of satisfying the preset relation, which is expressed as VC−FC=VR. The flow then comes to a step S10. If the positional relation between the variator lens 3 and the focus lens is found at the step S8 to be satisfying the preset relation necessary for retaining an in-focus state, the flow skips the step S9 and comes to the step S10.

At the step S10, the state of the power supply, or a shooting mode, is checked for its continuation. If the power supply is found to be off, or if the shooting mode is found to have been canceled, the flow of control comes to an end. If the shooting mode is found to be continuing, the flow comes back to the step S2 to make a check for the state of the zoom switch. If the zoom switch is found to be in its on-state indicating that the zooming operation is being performed, the state of the operation on the zoom switch is read in and the steps described above are repeated. If the zoom switch is found to be in an off-state thus indicating the end of zooming, the flow waits for a next operation on the zoom switch.

Figure 9A:
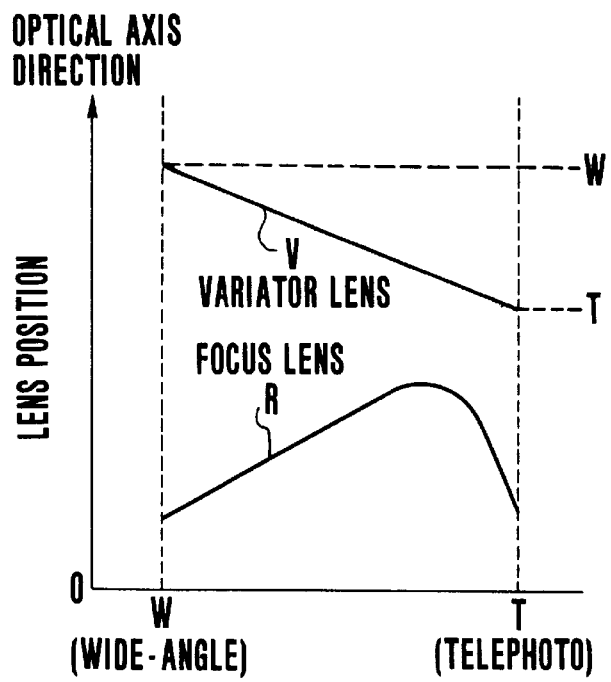
FIGS. 9(a), 9(b) and 9(c) show relations generally obtained between the variator lens and the focus lens.
Figure 9B:
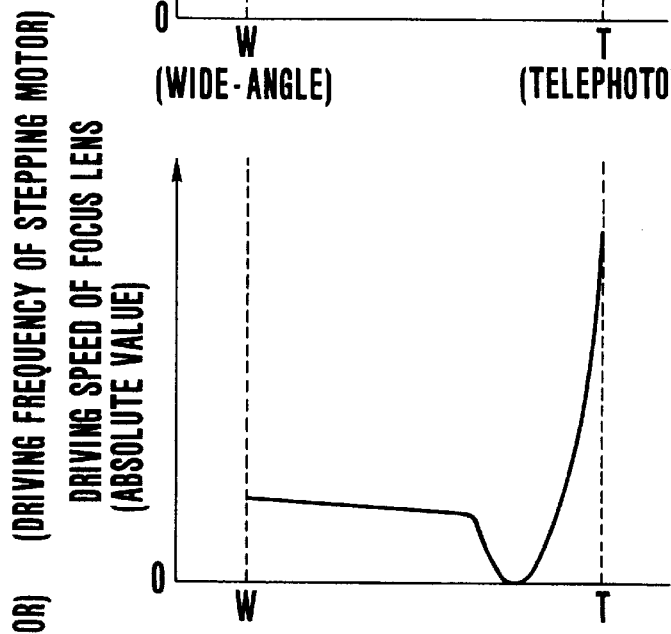
Figure 9C:
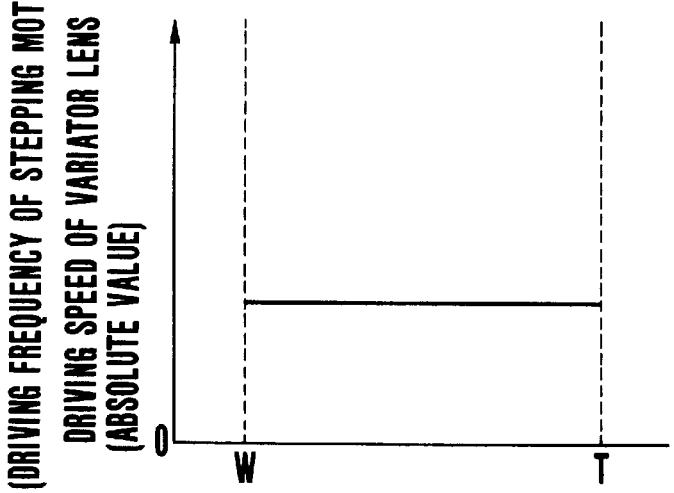

The control operation to be performed according to this invention is described in further detail as follows. As mentioned in the foregoing, the relation between the variator lens and the focus lens generally becomes as shown in FIG. 9(a). However, in a case where the variator lens moves from the wide-angle end position to the telephoto end position, the speed of the focus lens following the variator lens becomes as shown in FIG. 9(b). As a result, the driving direction of the focus lens reverses at an apex as shown in FIG. 9(a). The speed then temporarily drops to "0" at the point of reversal and then it comes to suddenly increase. Generally, the reversing position is located near to the telephoto end position. If the driving speed of the variator lens is not changed according to the position of the variator lens, as shown in FIG. 9(c), the focus lens suddenly comes to increase its speed, within a very short movement of the variator lens, after the reversal of the driving direction of the focus lens. As a result, it becomes impossible to have the focus lens follow the variator lens in the neighborhood of the telephoto end position. The stepping motor then comes out of phase to make control impossible.

In view of this problem, in accordance with this invention, the embodiment is arranged to allow the focus lens to accurately follow the variator lens by lowering the driving speed of the variator lens at the part where the driving speed of the focus lens would suddenly increase in the neighborhood of the telephoto end position. In other words, the variator lens is driven in accordance with speed information stored in a storing means, i.e., at such a speed as to make the focus lens driven at a predetermined constant speed in the telephoto end position, so that the movement of the focus lens in the neighborhood of the telephoto end position can be stably performed.

FIG. 3(a) shows characteristic curves showing a positional relation obtained between the variator lens 3 and the focus lens 5 according to this invention. FIG. 3(b) shows a characteristic curve showing the follow speed of the focus lens 5 when the variator lens 3 is moved from the wide-angle end position to the telephoto end position. FIG. 3(c) shows a characteristic curve showing the driving speed of the variator lens 3 for each position, of the variator lens 3 when moving from the wide-angle end position to the telephoto end position. These driving speeds for the variator lens 3 for its respective positions are stored in the form of a data table in the second memory 28.

In moving the variator lens 3 from the wide-angle end position to the telephoto end position, the driving speed of the variator lens 3 is read out from the second memory 28. On the other hand, information on the relative positions of the variator lens 3 and the focus lens 5 is read out from the first memory 27 to compute the driving speed of the focus lens 5 according to the information read out.

Since the moving direction of the focus lens 5 reverses at the apex of the characteristic curve as shown in FIG. 3(a), the driving speed of the focus lens 5 becomes "0" at a position corresponding to the apex. After this position, the focus lens 5 is driven in the reverse direction. However, since the driving speed of the variator lens 3 comes to be decelerated as shown in FIG. 3(c), the driving speed of the focus lens 5 then becomes about the same as before.

Therefore, unlike the conventional arrangement shown in FIG. 9(b), the focus lens 5 can be smoothly driven without suddenly increasing the speed. The invented arrangement not only prevents having an out-of-phase state by preventing any sudden increase in the driving frequency of the stepping motor but effectively prevents a noise increase to enable a zooming action to be stably and silently carried out.

Further, since an image picked up near the telephoto end position varies at a greater rate than an image picked up near the wide-angle end position, the operability of the video camera is never impaired by the arrangement of lowering the driving speed of the variator lens.

In accordance with this invention, the embodiment is arranged to drive the variator lens and the focus lens with different stepping motors, and to control their driving speeds by storing information on these speeds in the form of the frequency of the stepping motor driving step pulses and by carrying out an arithmetic operations. The invented arrangement thus facilitates control actions and permits highly accurate control.

Incidentally, while the first counter 21 and the second counter 22 are arranged discretely from the microcomputer 18 in the embodiments of this invention, they may be disposed within the microcomputer 18 as internal counters.

Next, a second embodiment of this invention is described as follows.

The first embodiment described above is provided with the first memory 27 which is arranged to store the information VR on a difference between the position of the variator lens 3 and that of the focus lens 5 for each lens position and the second memory 28 which is arranged to store the information on the driving speeds to be used for driving the variator lens 3. The first embodiment is arranged to compute and control the driving speeds for driving the focus lens 5 according to the information read out from the first memory 27 and the driving speed information of the variator lens 3 read out from the second memory 28. On the other hand, in the case of the second embodiment, a third memory 29 in provided in place of the second memory 28 which stores the driving speed information of the variator lens 3. The third memory 29 is arranged to store information on the driving speeds of the focus lens 5 in the form of a data table like the table shown in FIG. 4. The second embodiment is thus arranged to control the driving speed of the variator lens 3 according to the position information stored in the first memory 27 and the driving speed information of the focus lens 5 stored in the third memory 29. This arrangement also results in the characteristics shown in FIGS. 3(a) to 3(c).

Figure 5:
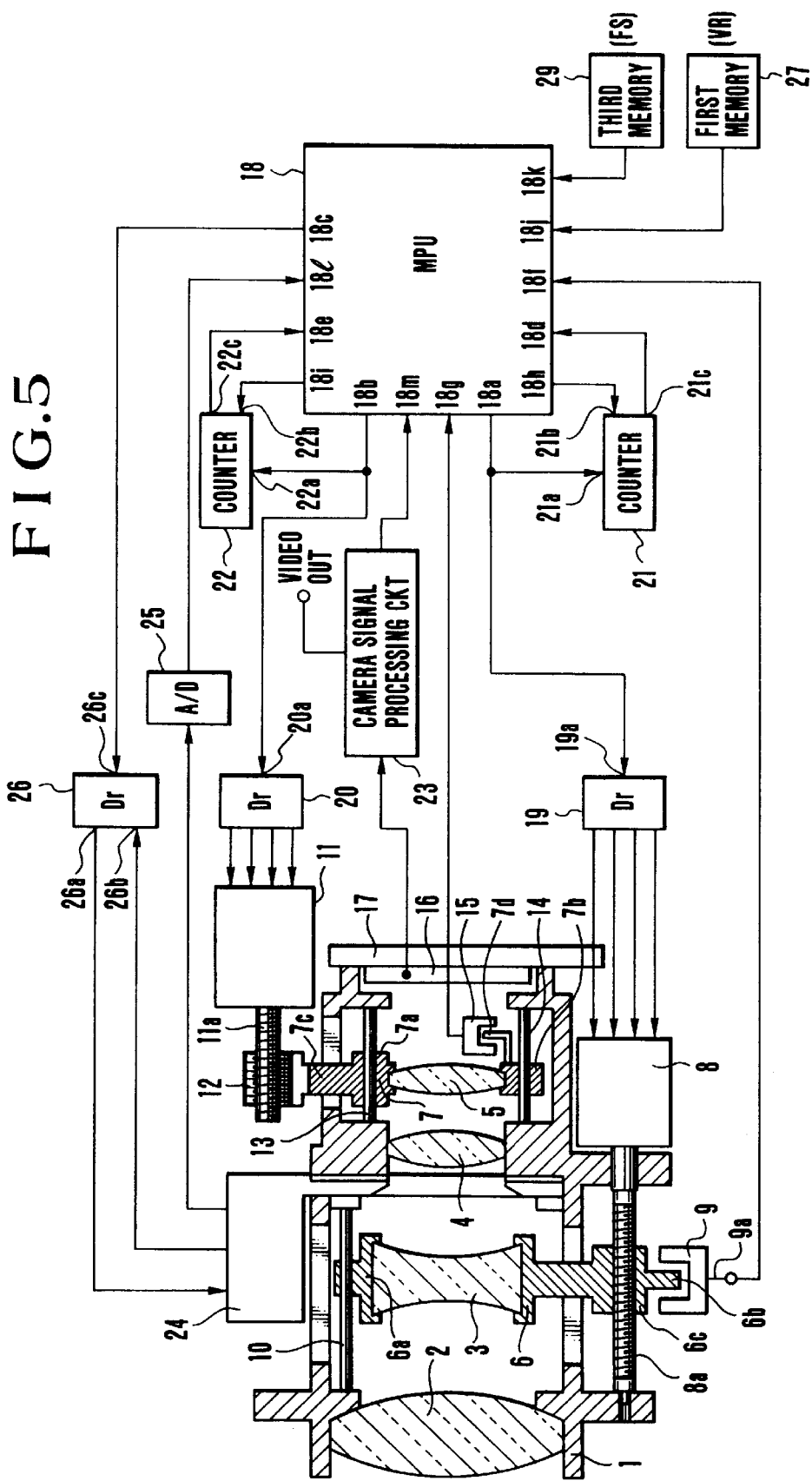
FIG. 5 is a block diagram showing the arrangement of a video camera arranged as a second embodiment of this invention.

FIG. 5 shows the arrangement of the second embodiment. This arrangement differs from the arrangement shown in FIG. 1 in that the second memory 28 which stores the driving speed information of the variator lens 3 is replaced with the third memory 29 which is arranged to store the driving speed information of the focus lens 5 corresponding to the positions of the variator lens 3 and those of the focus lens 5 and that a control sequence performed by the microcomputer 18 is changed. With the exception of these points, the rest of the arrangement is the same as the arrangement of the first embodiment shown in FIG. 1.

Figure 6:
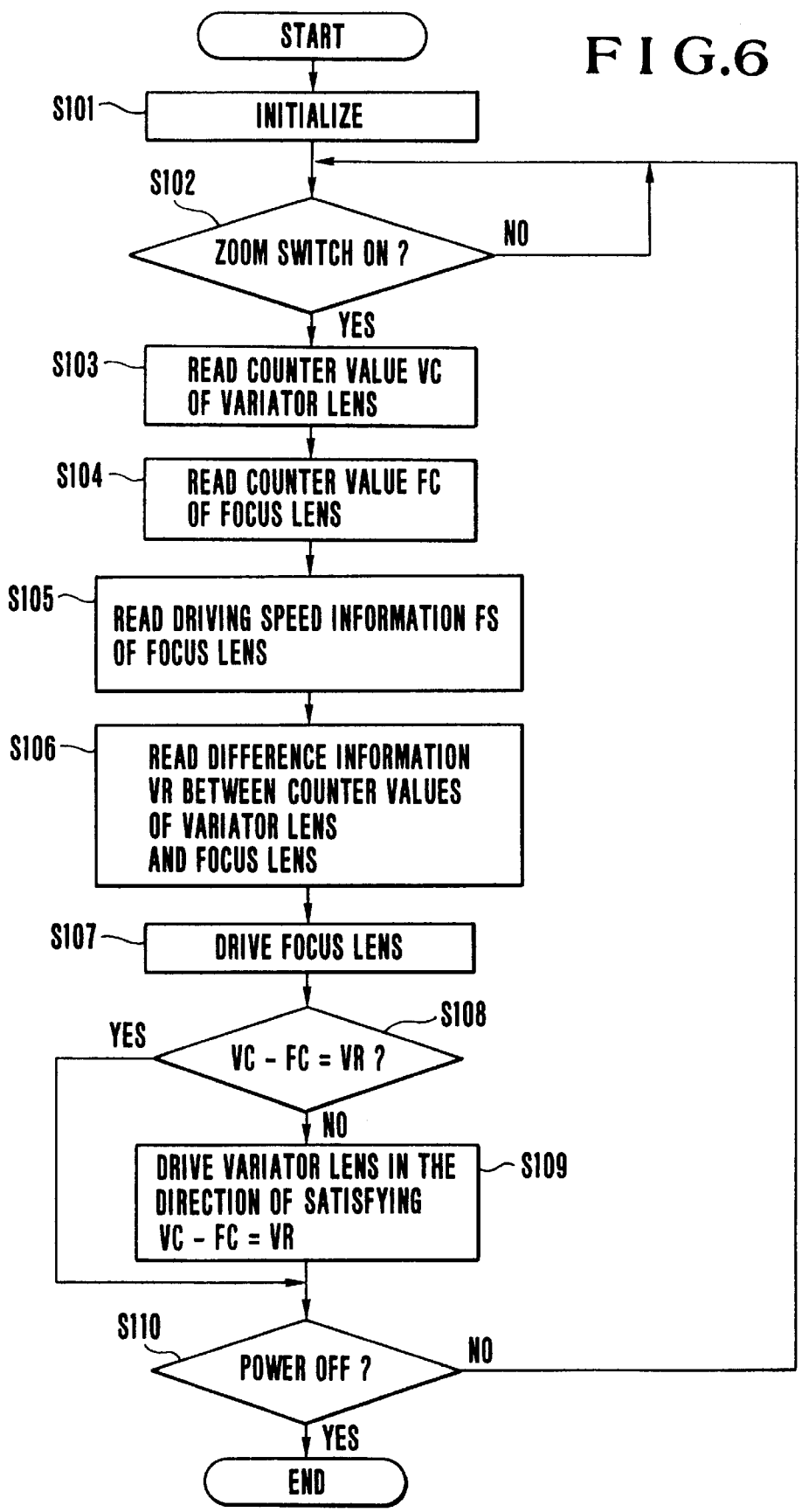
FIG. 6 is a flow chart showing a zooming control operation of the second embodiment of this invention.

FIG. 6 shows the control operation of the second embodiment in a flow chart. Referring to FIG. 6, the microcomputer 18 begins to control when the power supply for the video camera is turned on. At a step S101, the variator lens 3 and the focus lens 5 are driven to their initial positions which are datum points where, as mentioned in the foregoing, the first and second counters 21 and 22 are reset with the projections 6b and 7b coming into the slits of the first and second photointerrupters 9 and 15 to change their outputs. An initializing action is thus accomplished. Upon completion of the initialization, the flow of control operation comes to a step S102.

At the step S102, a check is made for a zooming operation. If a zoom switch which is not shown is found to be in an on-state, the flow comes to a step S103. At the step S103, information VC on the position of the variator lens 3 is read in through the count value of the first counter 21. At a step S104, information FC on the position of the focus lens 5 is read in through the count value of the second counter 22. At a step S105, from the table in the third memory 29, information FS on the driving speed of the focus lens 5 corresponding to the position information VC and the position information FC is read on the basis of the position information VC and FC.

At a step S106, the microcomputer 18 reads out, from the first memory 27 as mentioned above, information VR on a difference between the count values of the first and second counters 21 and 22, i.e., a difference between the curves V and R shown in FIG. 3(a), which represents an apposite positional relation between the variator lens 3, and the focus lens 5 which should be obtained after the start of driving and is determined by the positions of the variator lens 3 and the focus lens 5 and according to whether the zoom switch is pushed for zooming toward the telephoto end position or toward the wide-angle end position.

At a step S107, the microcomputer 18 begins to cause the focus lens 5 to be driven at a speed decided on the basis of the driving speed information FS of the focus lens 5 obtained at the step S105.

At a step S108, a check is made to find if the positional relation between the variator lens 3 and the focus lens 5 is satisfying a preset relation necessary for retaining an in-focus state. More specifically, the check is made to find if the difference between the count values of the first counters 21 and 22 which represent respectively the position information VC of the variator lens 3 and the position information FC of the focus lens 5 is equal to the difference information VR.

If the positional relation between the variator lens 3 and the focus lens 5 is found at the step S108 to be not the preset relation required for retaining an in-focus state, the flow comes to a step S109. At the step S109, the variator lens 3 is driven in the direction of satisfying the preset relation, which is expressed as VC–FC=VR. The flow then comes to a step S110. If the positional relation between the variator lens 3 and the focus lens 5 is found at the step S108 to be satisfying the preset relation necessary for retaining an in-focus state, the flow skips the step S109 and comes to the step S110.

At the step S110, the state of the power supply, or a shooting mode, is checked for its continuation. If the power supply is found to be off, or if the shooting mode is found to have been canceled, the flow of control comes to an end. If the shooting mode is found to be continuing, the flow comes back to the step S102 to make a check for the state of the zoom switch. If the zoom switch is found to be in its on-state indicating that the zooming operation is being performed, the state of the operation on the zoom switch is read in and the steps described above are repeated. If the zoom switch is found to be in an off-state thus indicating the end of zooming, the flow waits for a next operation on the zoom switch.

The use of the third memory 29 which stores the driving speed information of the focus lens 5 makes the second embodiment also capable of suppressing the increase of the driving speed of the focus lens 5 in the neighborhood of the telephoto end position, as shown in FIG. 3(b), in the same manner as the first embodiment described in the foregoing.

The following describes a third embodiment of this invention.

Each of the first and second embodiments described is arranged to attain the driving speed characteristic of the focus lens 5 shown in FIG. 3(b) by using either the second memory 28 which stores the driving speed information of the variator lens 3 or the third memory 29 which stores the driving speed information of the focus lens 5 in conjunction with the first memory 27 which stores the information VR on a difference between the position of the variator lens 3 and that of the focus lens 5, for each lens position, and by using information on each position of the variator lens 3 and that of the focus lens 5 and information on the driving speed of the variator lens 3 or on the driving speed of the focus lens 5.

The third embodiment omits the first memory 27 and has the second memory 28 which stores the driving speed information of the variator lens 3 and the third memory 29 which stores the driving speed information of the focus lens 5. The third embodiment is thus arranged to perform driving control of the zoom lens on the basis of data stored in these memories 28 and 29 in such a way as to permit simplification of the arithmetic operation involved and an increase in speed.

Figure 7:
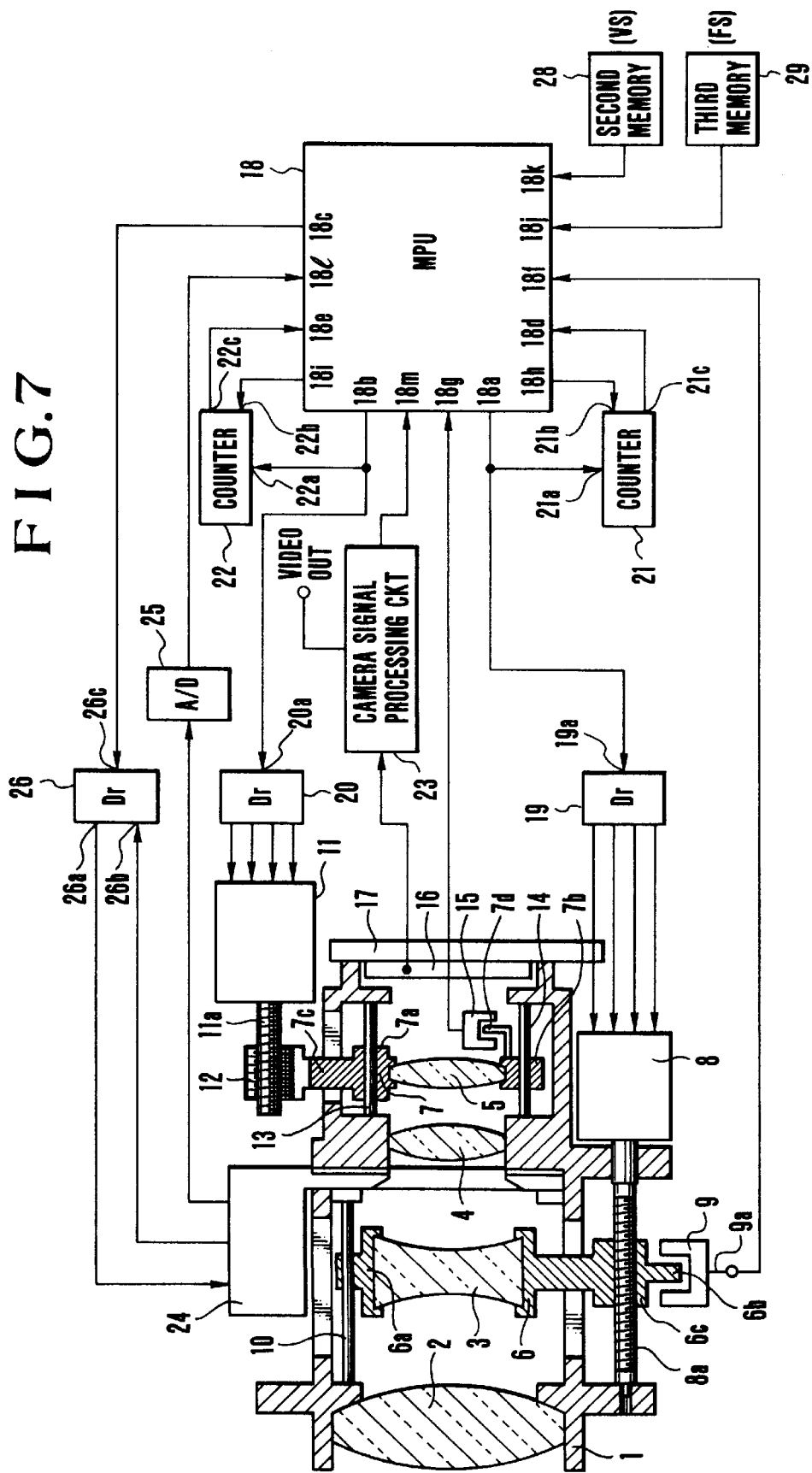
FIG. 7 is a block diagram showing the arrangement of a video camera arranged as a third embodiment of this invention.

The arrangement of the third embodiment is shown in FIG. 7. The arrangement of the third embodiment differs from that of the first embodiment shown in FIG. 1 in the provision of the second memory 28 which stores the driving speed information of the variator lens 3 and the third memory 29 which stores the driving speed information of the focus lens corresponding to the positions of the variator lens 3 and the focus lens 5 and a modification of control sequence made within the microcomputer 18.

Figure 8:
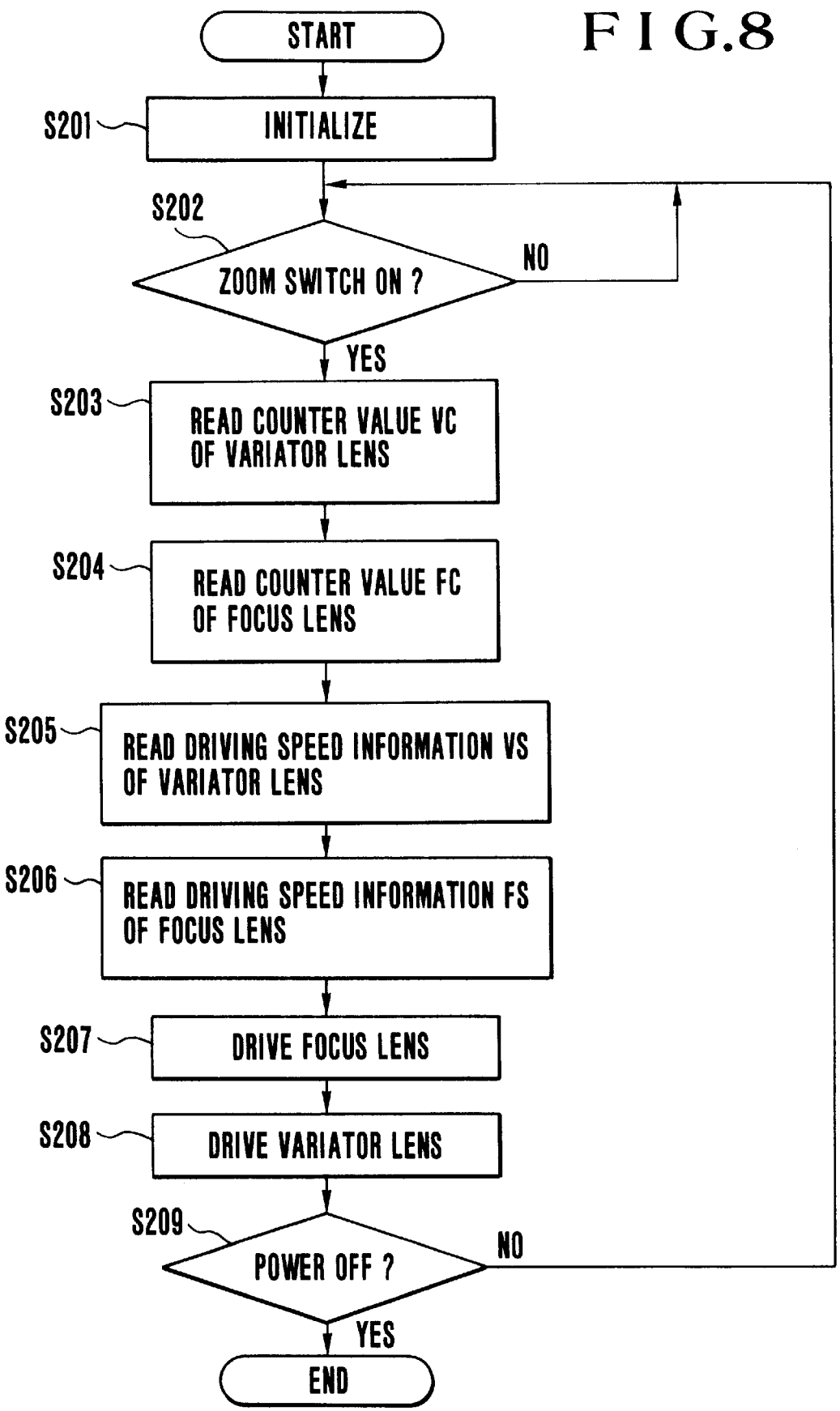
FIG. 8 is a flow chart showing a zooming control operation of the third embodiment of this invention.

FIG. 8 shows the control operation of the third embodiment in a flow chart. Referring to FIG. 8, when the power supply for the video camera is turned on, the microcomputer 18 starts its control operation. At a step S201, as mentioned in the foregoing, the variator lens 3 and the focus lens 5 are driven to their initial positions which are datum points where the first and second counters 21 and 22 are reset with the projections 6b and 7b coming into the slits of the first and second photointerrupters 9 and 15. An initializing action is them completed.

Upon completion of the initialization, the flow of control operation comes to a step S202. At the step S202, a check is made for a zooming operation. If a zoom switch which is not shown is found to be in an on-state, the flow comes to a step S203. At the step S203, information VC on the position of the variator lens 3 is read in through the count value of the first counter 21. At a step 204, information FC on the position of the focus lens 5 is read in through the count value of the second counter 22. At a step S205, from the table in the second memory 28, information VS on a driving speed of the variator lens 3 corresponding to the positions of the variator lens 3 and the focus lens 5 and the direction of zooming operation is read in. At a step S206, from the table in the third memory 29, information FS on a driving speed of the focus lens 5 corresponding to the variator-lens position information VC, the focus-lens position information FC and the direction of zooming operation is read in.

At a step S207, the focus lens 5 is driven at a speed based on the driving speed information FS read out. At a step S208, following the step S207, the variator lens 3 is driven at a speed based on the driving speed information VS read out.

At a step S209, the state of the power supply, or a shooting mode, is checked for its continuation. If the power supply is found to be off, or if the shooting mode is found to have been canceled, the flow of control comes to an end. If the shooting mode is found to be continuing, the flow comes back to the step S202 to make a check for the state of the zoom switch. If the zoom switch is found to be in its on-state indicating that the zooming operation is being performed, the state of the operation on the zoom switch is read in and the steps described above are repeated. If the zoom switch is found to be in an off-state thus indicating the end of zooming, the flow waits for a next operation on the zoom switch.

With the third embodiment arranged to have information on the driving speed of the variator lens 3 and the driving speed of the focus lens 5 stored in the memories, for each of the positions of the variator lens 3 and the focus lens 5, and to drive these lenses 3 and 5 by reading applicable data out from these memories one after another, the characteristic curves shown in FIG. 3(a) can be accurately traced, so that the zooming operation can be carried out without any defocusing. Like the first and second embodiments described in the foregoing, the third embodiment is capable of suppressing the increase in the driving speed of the focus lens 5 in the neighborhood of the telephoto end position, so that the driving motor for the focus lens 5 can be prevented from coming into an out-of-phase state to effectively mitigate noises.

According to the arrangement of this embodiment, speed information conforming to the characteristic shown in FIG. 3(c) is stored in the third memory 29 which stores the driving speed information of the variator lens 3, speed information conforming to the characteristic shown in FIG. 3(b) is stored in the second memory 28 which stores the driving speed information of the focus lens 5, and the lens control actions are accomplished according to the information read out from these memories. This arrangement dispenses with the memory which is arranged to store the information VR on a difference in count value between the first and second counters 21 and 22 (information on a difference between the curves V and R shown in FIG. 3(a)) showing a positional relation between the variator lens 3 and the focus lens 5. In addition to this advantage, the arrangement also obviates the necessity of a process of comparing the difference between the count values of the first and second counters 21 and. 22 with the difference information VR for the purpose of finding whether the position of the variator lens 3 and that of the focus lens 5 are satisfying a predetermined relation necessary for retaining an in-focus state. Therefore, the arrangement of the third embodiment simplifies the arithmetic operation of the microcomputer 18 to permit a high-speed process.

As described in the foregoing, the video camera according to each embodiment of this invention is arranged to store driving speed information of a variator lens for various positions of the variator lens and a focus lens in a memory, to drive the variator lens according to the driving speed information, and to drive the focus lens in such a way as to satisfy another set of information on the relative positions of the variator lens and the focus lens which is stored in another memory. The invented arrangement enables the video camera to prevent the driving speed of the focus lens from becoming extremely high in the neighborhood of the telephoto end position and to permit high-speed zooming without much noises. In addition, the arrangement of decelerating the driving speed of the variator lens in the neighborhood of the telephoto end position ensures that the angle of view varies at a constant speed to give a naturally zoomed video image.

What is claimed is:

1. A video camera arranged to carry out a magnifying power varying action on a zoom lens while keeping a variator lens and a focus lens thereof in a predetermined relation, comprising:

a) storing means for storing information on driving speeds at which said variator lens is to be driven at respective different positions of said variator lens along an optical axis;

b) position detecting means for detecting positions of said variator lens and of said focus lens along said optical axis; and c) control means for driving said variator lens and said focus lens according to driving information of said variator lens and focus lens read out from said storing means on the basis of a result of detection made by said position detecting means, so that a driving speed of said variator lens is decreased in a predetermined region adjacent a telephoto end position of said zoom lens and a driving speed of said focus lens is a substantially constant speed similar to a normal region during said variator lens being driven through the predetermined region adjacent a telephoto end position.

2. A video camera according to claim 1, wherein said predetermined relation is a positional relation between the variator lens and the focus lens for maintaining an in-focus state during a zooming operation, and said control means includes a memory memorizing said relation.

3. A video camera according to claim 2, wherein said control means decelerates the driving speed of the variator lens near the telephoto end.

4. A video camera according to claim 2, wherein said control means drives the variator lens and the focus lens to a predetermined initial position in response to ON of a power source to reset the position detecting means.

5. A video camera according to claim 1, further comprising a stepping motor for respectively driving the variator lens and the focus lens.

6. A lens control apparatus arranged to carry out a magnifying power varying action on a zoom lens while keeping a variator lens and a focus lens thereof in a predetermined relation, comprising:

a) storing means for storing information on driving speeds at which said focus lens is to be driven at respective different positions of said focus lens along an optical axis;

b) position detecting means for detecting positions of said variator lens and of said focus lens along said optical axis; and c) control means for driving said variator lens and said focus leans according to driving information of said focus lens read out from said storing means on the basis of a result of detection made by said position detecting means, said control means controlling a driving speed of said variator lens to decrease in a predetermined region adjacent to a telephoto end of said zoom lens such that said driving speed of said focus lens is a substantially constant speed similar to a normal region during said variator lens being driven in the predetermined region.

7. A lens control apparatus according to claim 6, wherein said predetermined relation is a positional relation between the variator lens and the focus lens for maintaining an in-focus state during a zooming operation, and said control means includes a memory memorizing said relation.

8. A lens control apparatus according to claim 7, wherein the control means decelerates the driving speed of the variator lens near the telephoto end.

9. A lens control apparatus according to claim 8, wherein the memory memorizes information indicating a relative positional relation enabling maintenance of an in-focus state of the variator lens and the focus lens.

10. A lens control apparatus according to claim 7, wherein the control means drives the variator lens and the focus lens to a predetermined initial position in response to ON of a power source to reset the position detecting means.

11. A video camera according to claim 10, wherein the predetermined position is a positional relation between the variator lens and the focus lens for maintaining an in-focus state during a zooming operation.

12. A video camera according to claim 11, further comprising a stepping motor for driving the variator lens and the focus lens, respectively, wherein the position detecting means includes a counter for counting drive pulses supplied to each stepping motor.

13. A video camera according to claim 11, wherein, the control means decelerates the driving speed of the variator lens near the telephoto end.

14. A lens control apparatus according to claim 6, further comprising a stepping motor for respectively driving the variator lens and the focus lens, and the position detecting means includes a counter for counting drive pulses supplied to each stepping motor.

15. A lens control apparatus arranged to carry out a magnifying power varying action on a zoom lens while keeping a variator lens and a focus lens thereof in a predetermined relation, comprising:

a) storing means for storing information on driving speeds at which said variator lens is to be driven at respective different positions of said variator lens along an optical axis and information on driving speeds at which said focus lens is t be driven at respective different positions of said focus lens along said optical axis;

b) position detecting means for detecting positions o said variator lens and of said focus lens along said optical axis; and c) control means for driving said variator lens and said focal lens for said magnifying power varying action on the basis of driving information of said variator lens and of said focus lens read out from said storing means according to a result of detection made by said position detecting means, so that a driving speed of said variator lens is decreased in a predetermined region adjacent a telephoto end position of said zoom lens and a driving speed of said focus lens is substantially constant and similar to a normal region during said variator lens being driven in the predetermined region adjacent the telephoto end position of said zoom lens.

16. An apparatus according to claim 15, further comprising stepping motors for respectively driving the variator lens and the focus lens.

17. An apparatus according to claim 16, wherein said position detecting means includes a counter for counting drive pulses supplied to each stepping motor.

18. An apparatus according to claim 15, wherein said control means drives the variator lens and the focus lens to a predetermined initial position in response to ON of a power source to reset the position detecting means.

19. An apparatus according to claim 15, wherein said storing means stores a positional relation between the variator lens and the focus lens for maintaining an in-focus state during a zooming operation.

* * * * *

UNITED STATES PATENT AND TRADEMARK OFFICE
CERTIFICATE OF CORRECTION

PATENT NO. : 6,169,578 B1
DATED : January 2, 2001
INVENTOR(S) : Tatsuo Chigira

It is certified that error appears in the above-identified patent and that said Letters Patent is hereby corrected as shown below:

Column 1,
Line 42, delete "arid" and insert -- and --.

Column 2,
Line 51, delete "et" and insert -- a --.

Column 3,
Line 32, delete -- uniformalized --.

Column 5,
Line 27, delete "181" and insert -- 18 ( --.

Column 16,
Line 33, delete "t be" and insert -- to be --.
Line 35, delete "o said" and insert -- of said --.

Signed and Sealed this

First Day of January, 2002

Attest:

Attesting Officer

JAMES E. ROGAN
Director of the United States Patent and Trademark Office